(12) United States Patent
Szabo et al.

(10) Patent No.: US 6,371,529 B1
(45) Date of Patent: Apr. 16, 2002

(54) QUICK CONNECTOR WITH SWIVELABLE RETAINER HOUSING

(75) Inventors: George Szabo, Ortonville; Jamie T. Weinert, Escanaba, both of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/473,461

(22) Filed: Dec. 28, 1999

(51) Int. Cl.⁷ ................................................. F16L 37/00
(52) U.S. Cl. ....................................................... 285/319
(58) Field of Search ................................. 285/319, 308, 285/272, 275

(56) References Cited

U.S. PATENT DOCUMENTS

| | | | |
|---|---|---|---|
| 4,423,892 A | 1/1984 | Bartholomew | 285/319 |
| 5,542,716 A | 8/1996 | Szabo et al. | 285/305 |
| 5,730,481 A | 3/1998 | Szabo | 285/305 |
| 5,782,502 A | 7/1998 | Lewis | 285/87 |
| 5,863,077 A | 1/1999 | Szabo | 285/3 |
| 5,882,048 A * | 3/1999 | Kawasaki et al. | 285/319 |
| 5,924,746 A * | 7/1999 | Fixemer | 285/319 X |
| 5,951,063 A | 9/1999 | Szabo | 285/303 |
| 6,155,612 A * | 12/2000 | Szabo | 285/319 |
| 6,173,998 B1 * | 1/2001 | Bock | 285/319 |

FOREIGN PATENT DOCUMENTS

GB  2077377 A  *  8/1980  ................. 285/319

* cited by examiner

Primary Examiner—Lynne H. Browne
Assistant Examiner—David E. Bochna
(74) Attorney, Agent, or Firm—Young & Basile, P.C.

(57) ABSTRACT

A quick connector includes a housing assembly and a retainer for sealingly interconnecting first and second conduits in fluid flow communication. The housing assembly is formed of first and second housings which are rotatably and non-displaceably interconnected. The retainer is mountable in the second housing for locking a raised annular flange on one conduit within the housing assembly in fluid flow communication with the bore extending through the housing assembly. A plurality of latch fingers extend from one housing and rotatingly, but non-axially displaceable, engage a raised flanges on the other housing.

4 Claims, 3 Drawing Sheets

QUICK CONNECTOR WITH SWIVELABLE RETAINER HOUSING

BACKGROUND OF THE INVENTION

1. Field of the Invention

The present invention relates, in general, to fluid quick connector assemblies which couple male and female connector components and, more specifically, to fluid quick connectors having an internal retainer which locks the male connector component in the female connector component.

2. Description of the Art

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a female connector component or element. The retainer has a plurality of radially and angularly extending legs which extend inwardly toward the axial center line of the bore in the housing. A tube or male fitting to be sealingly mounted in the bore in the female component includes a radially upset portion or flange which abuts an inner peripheral surface of the retainer legs. Seal and spacer members as well as a bearing or top head are typically mounted in the bore ahead of the retainer to form a seal between the housing and the male fitting when the male fitting is lockingly engaged with the retainer legs.

Radially displaceable retainers are also known in which the retainer is radially displaceable through aligned bores or apertures formed transversely to the main through bore in the female component or housing. The radially displaceable retainer is typically provided with a pair of depending legs which are sized and positioned to slip behind the radially upset portion or flange on the male conduit only when the male connector or conduit is fully seated in the bore in the female connector. This ensures a positive locking engagement of the conduit with the female connector as well as providing an indication that the conduit is fully seated since the radially displaceable retainer can be fully inserted into the female connector only when the has been fully inserted into the bore in the female connector.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

Due to the secure engagement between the conduit and the female component, the open end of the axial through bore in the female connector portion of a fluid connector designed with an axially displaceable retainer or the transverse bores in a female connector designed to receive a radially displaceable retainer are fixed in one position depending upon the position of the tubing and the female connector when the tubing and female connector are joined together. In certain applications, this could limit or make it difficult to insert the retainer into the female component, particularly in the case of a radial retainer. Interference with surrounding components frequently makes access to the quick connector for both locking or unlocking operations difficult, if not impossible.

Thus, it would be desirable to provide a fluid quick connector which overcomes the problems of previously devised quick connectors with respect to ease of insertion of the retainer into the quick connector while still providing all of the required attributes of a fluid quick connecter in terms of sealing and locking engagement between the male and female components of the quick connector. It would also be desirable to provide such a fluid quick connector which achieves the aforementioned advantages without requiring significant modification to existing, proven quick connector designs. It would also be desirable to provide a fluid quick connector which is easily rotatable over 360° to facilitate insertion or removal of the retainer into or out of the quick connector.

SUMMARY OF THE INVENTION

The present invention is a quick connect for joining first and second conduits in fluid flow communication which enables the retainer receiving portion of the quick connector to be swiveled over a complete 360° recent range to facilitate easy access to the retainer or the retainer receiving portion of the quick connector for insertion or removal of the retainer from the quick connector housing.

In one aspect of the invention, the present quick connector includes a first housing having a through bore with a first bore portion adapted for receiving a first end of a first conduit. A seal element is mounted in the first bore portion sealing engagable between the first housing in the first end of the first conduit. A second housing is rotatably and non-axially displaceably connected to the first housing. The second housing has a through bore axially alignable with the first bore portion of the first housing for receiving the first conduit therethrough. A retainer is mountable in the second housing for lockingly coupling the first conduit to the first and second housings.

According to another aspect of the present invention, mounting means are cooperatively mounted on the first and second housings for rotatably interconnecting the first and second housing. The mounting means preferably comprises a raised annular flange formed on one of the first and second housing and a plurality of latch fingers projecting from one end of the other of the first and second housings and mockingly engagable with the annular flange to resist axial displacement of the first and second housings relative to each other while permitting rotational displacement of the first and second housings relative to each other.

In a specific aspect of the invention, the latch fingers carry a notch engagable with the annular flange on the other of the first and second housings. Preferably, at least two or three latch fingers are provided on one of the first and second housings.

According to another aspect of the present invention, a tubular sleeve extends coaxially from one end of the second housing concentric with the bore in the second housings. The tubular sleeve is insertable into the first bore portion of the first housing and retains the seal element within the first housing. In this aspect, the annular flange on one of the housings is insertable between the tubular sleeve and the latch fingers on the other housing.

According to another aspect of the present invention, a connector apparatus comprises a connector body adapted to mate with a male member along a first axis. A retainer is mountable in the connector body for interlocking the male member in the connector body. The connector body includes first and second housings rotatably and non-axially displacably joined together. One of the first and second housings is adapted for receiving the retainer.

The quick container with swivelable retainer housing of the present invention overcomes a disadvantage frequently encountered with the use of previously designed quick connectors which permit the retainer to be latched or unlatched from the quick connector housing in only one position, which position may be adjacent to another component limiting retainer access to the housing. The quick connector of the present invention uniquely provides a rotatable quick connector housing which enables the retainer receiving housing of the quick connector to be rotated over a full 360° range to facilitate easy access of the retainer to the rotatable housing. However, at the same time, the quick connector housing with rotatable housing features maintains all of the functions and advantages of a standard quick connector housing in terms of easy insertion of a conduit therein and high pullout forces locking the conduit in the quick connector.

BRIEF DESCRIPTION OF THE DRAWING

The various features, advantages and other uses of the present invention will become more apparent by referring to the following detailed discussion and drawing in which.

DESCRIPTION OF THE PREFERRED EMBODIMENTS

Figure 1:
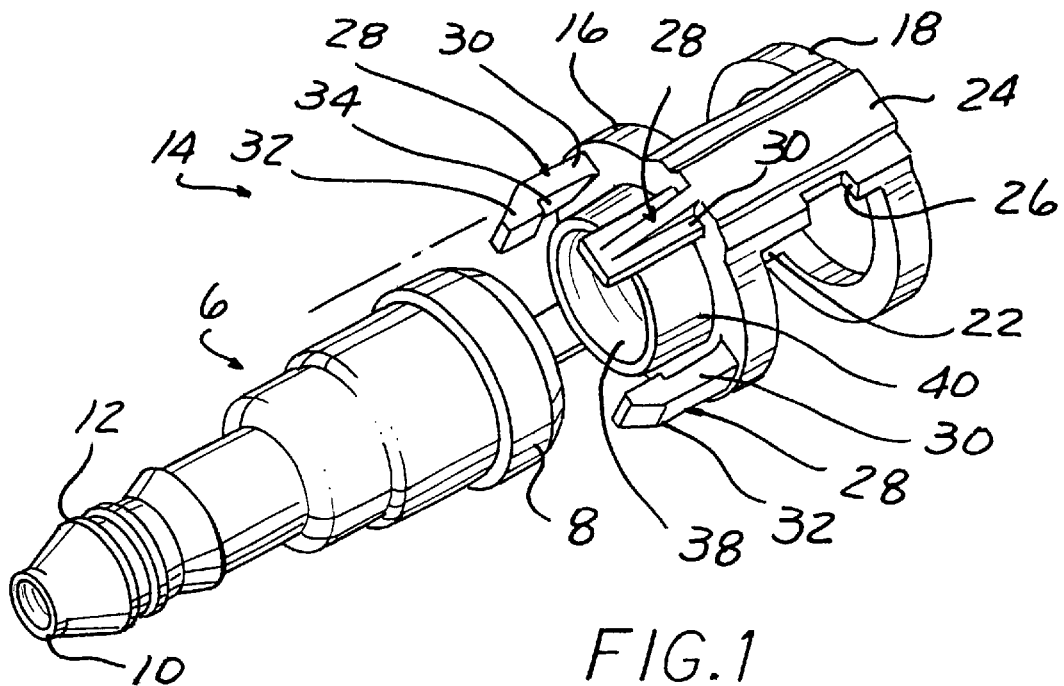
FIG. 1 is an exploded perspective view of the female housing assembly of a quick connector constructed in accordance with the teachings of the present invention.

Referring now to FIGS. 1–5, there is depicted one aspect of a quick connector constructed in accordance with the teachings of the present invention. As is conventional, the quick connector is adapted for sealingly and lockingly, yet removably interconnecting first and second conduits in a fluid tight, leak proof, sealed connection by a snap-together arrangement.

The quick connector includes a female housing assembly 2 formed of the first housing 6 and a second housing 14 which are adapted to be axially connected to provide an axially extending through bore between opposite ends.

The first housing 6 is formed of a one piece body, preferably of a high strength plastic, having a stepped exterior surface housing extending from a raised annular flange 8 at one end to an opposed second end 10. At least one and, preferably, a plurality of longitudinally spaced barbs or projections 12 are formed along the exterior of the first housing 6 for secure engagement with a flexible conduit, such as a plastic or elastomer conduit, which is slidably urged thereover, in a conventional manner, in a sealed connection with the barbs 12.

The second housing 14 is also preferably formed of a one piece, integral, unitary body, also of a high strength plastic, typically the same plastic used to form the first housing 6. The second housing 14 includes first and second annular ring members 16 and 18, respectively. The first and second ring members 16 and 18 are spaced apart and interconnected by a pair of side flanges 22 and 24 which extend between peripheral edges of the first and second ring members 16 and 18. Notches 26 are formed along one side edge of each of the side flanges 24 and 26 for receiving an interconnecting projection in a retainer, as described hereafter.

Preferably, the side flanges 22 and 24 are parallel to each other and, in conjunction with the first and second ring members 16 and 18, define transversely opening apertures 25 and 27. The transversely extending apertures 25 and 27 communicate with a through bore which extends longitudinally through the second housing 14 from a first aperture 20 within the second ring member 18 to an aperture or bore 38 extending through a tubular member or sleeve 36 projecting from the first ring member 16 and terminating in a first outer end 40.

According to a unique feature of the present invention, the second housing 14 is swivelably and rotatably connected to the first housing 6. The interconnection is provided by at least two and preferably three more latch fingers 28 which extend axially from the first ring member 16 and are spaced from the exterior surface of the tubular sleeve 36. Four latch fingers 28 are illustrated by example only. Preferably, the latch fingers 28 are provided in opposed pairs although uneven numbers of latch fingers, such as three latch fingers 28 may also be employed.

Each latch finger 28 is identically constructed of a generally planar arm 30 which extends from a connection at one end to the first ring member 16 to an enlarged projection 32 at an opposite end. An inner surface of the projection 32 and the inner surface of the arm 30 form a notch 34 which snaps over the flange 8 at one end of the first housing 6 and is freely rotatable about the longitudinal axis of the first housing 6 to swivelably and rotatably interconnect the first and second housings 6 and 14.

The quick connector further includes a generally U-shaped retainer 44 adapted to be received in the transverse apertures 25 and 27 in the second housing 14 such that legs 46 and 48 of the retainer will pass along either side of an exposed section 49 of a tube or conduit 51 as the retainer 44 is inserted leg-first into the second housing 14. More specifically, and referring to the enlarged perspective view of the retainer 44 illustrated in FIG. 2, the legs 46 and 48 of the retainer 44 extend in a first direction from opposite sides of an intermediate bridging portion or bight 50 of the retainer 44.

Each leg 46 and 48 includes an inner projection 52 which defines a "locking" surface 54 adapted to axially oppose and preferably, axially engage one side of the upset bead or flange 53 of he tube 52 when the retainer 44 is fully inserted in the second housing 14. In this manner, the locking surface 54 on each retainer leg 46 and 48 serves to prevent axial displacement of the upset bead 53 from the axial bore of the female housing assembly 2 beyond a predetermined point, thereby locking the conduit 51 therein. An inner projection 56 on the bight portion 50 likewise extends to define a locking surface 58 which is placed in axial opposition and, again, preferably in axial engagement with one side of the upset bead or flange 53 upon full insertion of the retainer 44 into the second housing 14.

In accordance with another aspect of the present invention, a cantilevered portion 60 of the inner projection 52 on each leg 46 and 48 defines a radially-disposed, resiliently-yieldable surface 62 thereon which faces the other leg 48 or 46. These opposed radial surfaces 62 interferingly engage the exposed longitudinal section 49 of the tube 51 upon full insertion of the retainer 44 into the second housing 14, thereby locking the retainer 44 within the second housing 14.

Returning to FIG. 2, one of the legs 46 of the retainer 44 extends to define a locking flap 64 at its free end 66. The locking flap 64 is preferably separated from the rest of the leg 46 by a living hinge 68 or similar bridging member of reduced thickness. In this manner, the locking flap 64 is advantageously integrally formed with the retainer 44. It will be appreciated, however, that the use of separately formed, e.g., separated molded, flap member which is thereafter hingedly interconnected with one of the legs 46 or 48 so as to pivot about a second axis 69 generally parallel to the first axis 31, either through use of integrally-formed hinge or a separate joining element, is also possible.

The locking flap 64 is permitted to pivot at the living hinge 68 about second axis 69 towards and, ultimately, into interlocking engagement with the free end 70 of the other leg 48, the latter being accomplished in the retainer 44 by means of interlocking engagement of a ramped locking projection 72 on the inside of leg 48 with a complementary slot 74 formed in the locking flap 64 adjacent the free end 66 of the leg 48.

In order to prevent loss of the locking flap 64 in the event of a structural failure of living hinge 68, a ramped locking projection 76 is also provided on the inside of leg 46 which likewise interlockingly engages a complementary slot 78 in the locking flap 64 immediately adjacent to hinge 68.

When the locking flap 64 is pivoted about axis 69 into interlocking engagement with the other leg 48, as well as with its own leg 46 as described in the previous paragraph, a surface 80 on the locking flap 64 is brought into axial opposition with and, preferably, axially engages the upset bead 53 of the tube 51 seated within the axial bore of the second housing 14. The locking flap 64 thus axially engages the upset bead 53 along a circumferential portion thereof diametrically opposite to the circumferential portion axially engaged by locking surface 58 on the bight 50. When added to the circumferential portions of the upset bead 53 axially engaged by the locking surface 54 on each leg 46 and 48, it will be appreciated that the quick connector assembly 20 provides for substantially symmetrical axial engagement of the upset bead 53 while eliminating creation of deleterious bending moments which might cause leaking or structural failure of the resulting connection.

Further details concerning the conventional construction of the retainer 44 can be had by referring to U.S. Pat. No. 5,782,502, the entire contents of which are incorporated herein by reference.

It will also be understood that the formation of the first and second housing portions 6 and 14 of the female connector 2 of the present invention may be used with other types of radially displaceable retainers shown in U.S. Pat. Nos. 5,542,716 and 5,951,063.

Further, the swivel connection between two portions of a female connector element can also be applied to quick connectors having axially displaceable retainers as shown in U.S. Pat. Nos. 5,542,712 and 5,456,600. In addition, the features of the present invention may also be applied so-called "squeeze-to-release" connectors shown by way of example in U.S. Pat. Nos. 5,873,610 and 5,568,946.

In each of these quick connector constructions, the female connector element or housing having the enlarged housing end portion and a stepped bore portion protruding therefrom is divided into two separate housings with interlocking elements on each portion engagable with each other to non-axially displaceably interconnect the two housing portions or elements; while enabling the two housings to be rotated or swivelled relative to each other.

As is conventional, the side flanges 22 and 24 in the second housing 14 includes a pair of centralized, axially-extending, inward opening notches, not shown, while the retainer 44 includes a catch means, such as a ramped external projection or retention barb 84, extending outwardly on each leg 46 and 48. The longitudinal notches cooperate with the retention barbs 84 to releasably secure the retainer 44 in a partially-inserted, "pre-assembly" or "shipping" position within the second housing 14.

In this manner, the retainer 44 can be retained with the second housing 14 while otherwise permitting axial passage of the upset bead 53 into the bore past the very same locking surfaces 54 and 58 on the retainer legs 46 and 48 and bight 50 that will later prevent axial displacement of the upset bead 53 upon full insertion of retainer 44 into the second housing 14.

Figure 5:
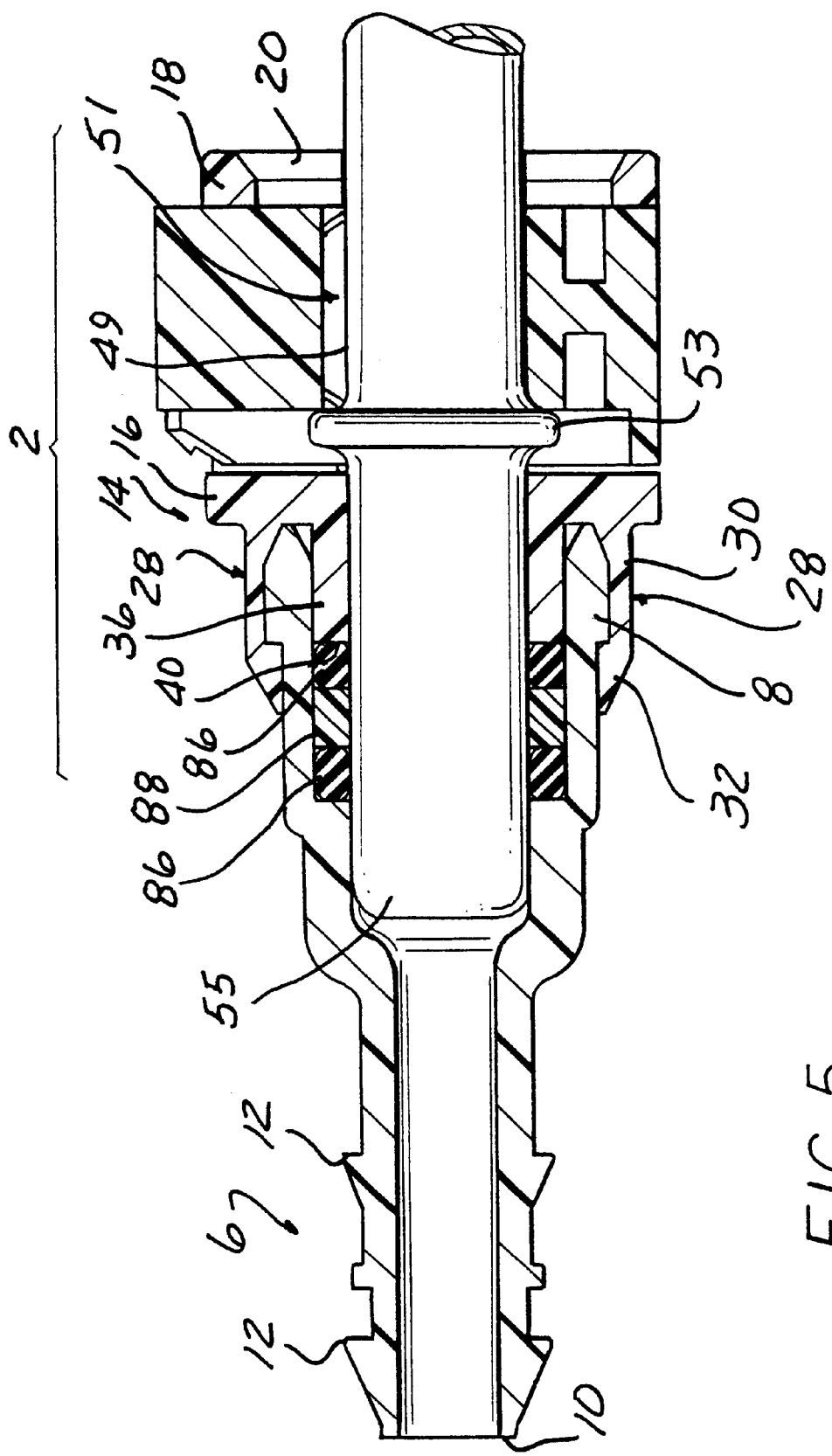
FIG. 5 is a longitudinal cross-sectional view through the assembled quick connector shown in FIG. 4.

As shown in FIG. 5, sealing means are mounted within the first housing 6 and include a pair of seal elements or O-rings 86 separated by an annular bushing 88. The O-rings, the bushing 88 and the inner surface of the tubular sleeve 36 on the second housing 14 sealingly engage the exterior surface of the first end portion 55 of the first conduit or tube 52.

The sleeve 36 on the retainer 44 acts as a top hat to retain the seal elements 86 and the bushing 88 in position within the bore in the first housing 6. As shown in FIG. 5, the sleeve 36 extends through the open end of the first housing 6 and into the first stepped, large diameter bore portion within the first housing 6 and has the outer end 40 in contact with or closely spaced from the axially endmost O-ring 86.

Figure 4:
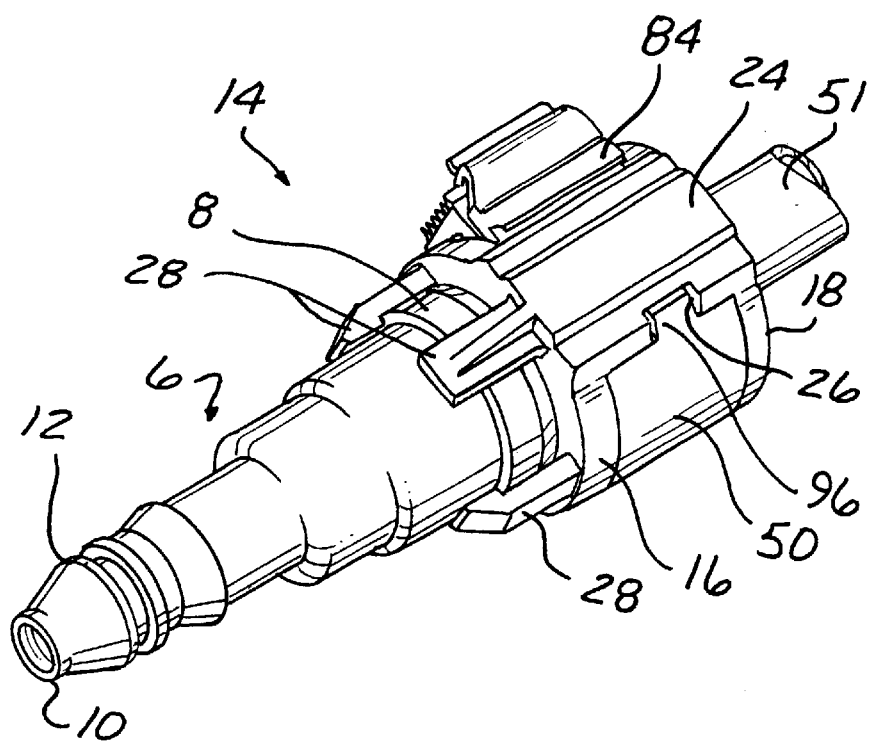
FIG. 4 is an assembled perspective view of the female housing portions and the retainer of the quick connector shown in FIGS. 1–3.
Figure 2:
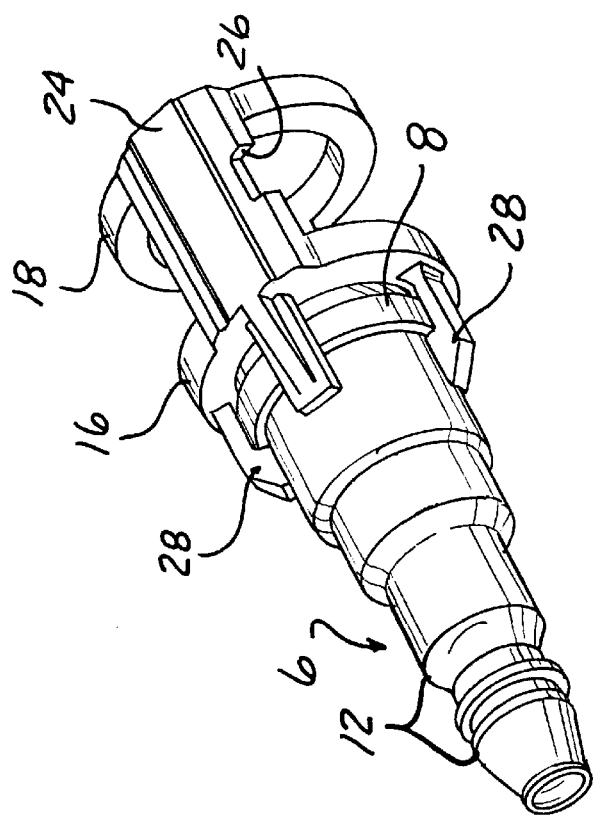
FIG. 2 is a perspective view of the assembled upper and lower female housing portions of the quick connector shown in FIG. 1.
Figure 3:
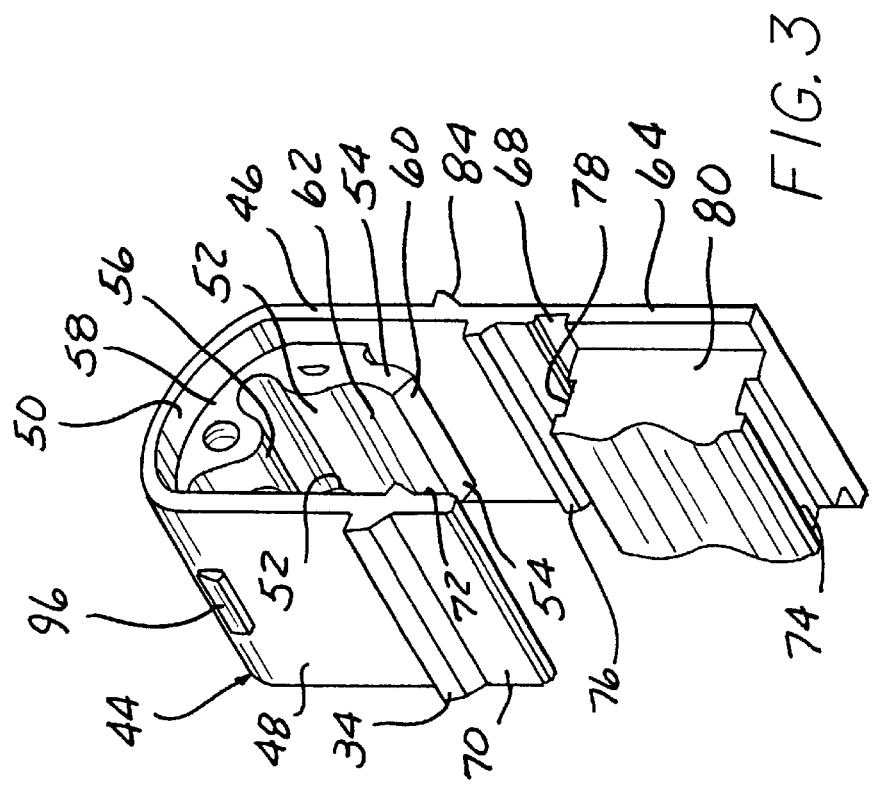
FIG. 3 is a perspective view of a retainer usable in the quick connector shown in FIG. 1.

FIGS. 4 and 5 depict the quick connector assembly of the present invention with the tube or conduit 51 fully seated within the internal bore in the first and second housings 6 and 14 of the female housing assembly 2. The legs 46 and 48 of the retainer 44 straddle the exposed section 49 of the conduit 51 adjacent the radially outwardly extending flange or upset bead 53, with the locking surfaces 54 and 58 on the legs 46 and 48 and the bight 50 in axially opposition/engagement with the radial flange 53 on the conduit 51. The tube or conduit 51 is now locked within the axial bore in the female housing assembly 2 through resilient radial engagement of the cantilevered portion 60 of the inner projections 52 on the legs 46 and 48 with the exposed section 49 of the conduit 51. To further ensure that the retainer 44 is securely locked within the second housing 14, FIG. 4 shows the engagement of the external retention barbs 84 with the complementary external locking surfaces 94 on the connector body adjacent the bottom of the connector body. Meanwhile, a tab 96 projecting from each of the legs 46 and 48 of the retainer proximate to the bight 50 engages the complementary notch 26 formed in the top of the side flanges 22 and 24 of the second housing 14.

When the second housing 14 is mounted on the first housing 6, the second housing 14 and the first housing 6 are non-axially displaceably interconnected by means of the interlocking projections 32 on each of the arms 30 of the latch fingers 28 on the second housing 14 and the corresponding radially enlarged projection 8 at one end of the first housing 6. However, the first and second housings 6 and 14 may be rotatably displaced relative to each other. This is particularly important as the second housing 14 may be rotated relative to the first housing 6 to provide a more convenient position to allow the retainer 44 to be inserted through the aligned apertures 25 and 27 in the second housing 14 for locking interconnection with the conduit 51.

Alternately, the latch fingers 28 can be mounted on the first housing and engage a raised flange on the second housing 14.

In summary, there has been disclosed a unique swivelable quick connector having two rotatably interconnected, non-axially displaceable housing portions, one of which receives a retainer for lockingly connecting a conduit into the joined housing portions for fluid communication with a conduit sealingly coupled to the other housing portion. This arrangement enables the housing portion which receives the retainer-to be swivelled or rotated to a more convenient position for insertion or removal of the retainer from the housing portion. The rotatable aspects of the present invention may be applied to a number of different quick connector configurations including quick connectors designed for both radially displaceable or axially displaceable retainers.

What is claimed is:

1. A quick connector for joining first and second conduits in fluid flow communication, the quick connector comprising:
    a first housing having a through bore with a first bore portion adapted for receiving a first end of a first conduit;
    a seal element mounted in the first bore portion sealing engagable between the first housing and the first end of the first conduit;
    a second housing having first and second end members, the second housing having a through bore axially alignable with the first bore portion of the first housing for receiving the first conduit therethrough;
    a tubular sleeve extending integral with and coaxially from the first end member of the second housing concentric with the bore through the second housing, the tubular sleeve insertable into the first bore portion of the first housing and retaining the seal element within the first housing;
    a retainer mountable in the second housing for lockingly coupling the first conduit to the first and second housings;
    a raised annular flange formed on the first housing; and
    a plurality of latch fingers projecting from the first end member of the second housing and lockingly engagable with the annular flange to resist axial displacement of the first and second housings relative to each other while permitting rotational displacement of the first and second housings relative to each other.

2. The quick connector of claim 1 wherein the latch fingers carry a notch engagable with the annular flange.

3. The quick connector of claim 1 wherein the plurality of latch fingers comprise at least three circumferentially spaced latch fingers.

4. The quick connector of claim 1 wherein the plurality of latch fingers comprise two pairs of diametrically opposed latch fingers.

* * * * *